(12) United States Patent  
Saito (10) Patent No.: US 7,365,777 B2  
(45) Date of Patent: Apr. 29, 2008

(54) DIGITAL CAMERA

(75) Inventor: Osamu Saito, Saitama-ken (JP)

(73) Assignee: Fujifilm Corporation, Tokyo (JP)

( * ) Notice: Subject to any disclaimer, the term of this patent is extended or adjusted under 35 U.S.C. 154(b) by 745 days.

(21) Appl. No.: 10/800,870

(22) Filed: Mar. 16, 2004

(65) Prior Publication Data

US 2004/0189819 A1 Sep. 30, 2004

(30) Foreign Application Priority Data

Mar. 24, 2003 (JP) .............................. 2003-080804

(51) Int. Cl.
*H04N 5/235* (2006.01)
*H04N 5/76* (2006.01)
(52) U.S. Cl. ................. 348/222.1; 348/231.6
(58) Field of Classification Search ............. 348/230.1, 348/231.6, 231.9, 218.1
See application file for complete search history.

(56) References Cited

U.S. PATENT DOCUMENTS

| | | | | |
|---|---|---|---|---|
| 6,642,956 | B1 * | 11/2003 | Safai ...................... | 348/222.1 |
| 6,757,019 | B1 * | 6/2004 | Hsieh et al. ............. | 348/302 |
| 6,992,711 | B2 * | 1/2006 | Kubo ...................... | 348/231.7 |
| 7,148,926 | B2 * | 12/2006 | Morinaka et al. ......... | 348/277 |
| 7,184,077 | B2 * | 2/2007 | Kitajima ................. | 348/220.1 |

FOREIGN PATENT DOCUMENTS

| | | |
|---|---|---|
| JP | 3-250316 A | 11/1991 |
| JP | 6-4661 A | 1/1994 |
| JP | 7-28988 A | 1/1995 |
| JP | 8-9385 A | 1/1996 |
| JP | 10-23365 A | 1/1998 |
| JP | 2000-20481 A | 2/2000 |
| JP | 2000-253305 A | 9/2000 |
| JP | WO-00/70596 A1 | 11/2000 |
| JP | 2001-177737 A | 6/2001 |
| JP | 2002-84493 | 3/2002 |
| JP | 2002-216121 A | 8/2002 |
| JP | 2002-247593 | 8/2002 |
| JP | 2003-87648 | 3/2003 |

* cited by examiner

*Primary Examiner*—David Ometz
*Assistant Examiner*—Luong T. Nguyen
(74) *Attorney, Agent, or Firm*—Birch, Stewart, Kolasch & Birch, LLP (57) ABSTRACT

First to third processors are arranged in a digital camera, one image (one frame) obtained by one photographing operation is divided into three regions (assigned regions), and photographing signal processing is shared by the first to third processors. Digital image signals of one image are divided and captured by the first to third processors while setting overlapping regions as regions required for photographing signal processing for the assigned regions. For this reason, the processors can also perform the photographing signal processing including an interpolating process to pixels near joined portions between the assigned regions. More specifically, since the photographing signal processing for the digital image data of one image can be shared by the plurality of processors and performed as parallel processing without causing an image breakage, an image capture interval can be shortened.

13 Claims, 8 Drawing Sheets

DIGITAL CAMERA

CROSS-REFERENCE TO RELATED APPLICATION

This application claims priority under 35 USC 119 from Japanese Patent Application No. 2003-80804, the disclosure of which is incorporated by reference herein.

BACKGROUND OF THE INVENTION

1. Field of the Invention

The present invention relates to a digital camera and, more particularly, to a digital camera which causes an image pickup element to photograph an object to obtain image data expressing an object image.

2. Description of the Related Art

In recent years, with higher resolution of image pickup elements such as CCDs (Charge Coupled Device) and CMOS (Complementary Metal-Oxide Semiconductor) image sensors, the number of pixels of digital cameras has increased, and digital cameras surpassing ten million pixels have been developed. With digital cameras, when the number of pixels of an image increases, the amount of data processing per photographing operation increases, and the image capture interval (waiting time until the next photographing operation can be made) becomes longer. For this reason, the following technique (Patent Document: Japanese Patent Application Laid-Open (JP-A) No. 10-23365) has been proposed. That is, a plurality of recording units for recording digital image data (hereinafter to be referred to as "image data") obtained by a photographing operation is arranged in a digital camera, and the image data are recorded in parallel with the plurality of recording units.

However, the conventional technique aimed to increase the speed of a recording process of image data. Thus, the speed could not be increased in photographing signal processing such as defective pixel correction, edge emphasizing process, and Y-C conversion process, which are conducted on the image data before the recording process. Therefore, there was a limit to the extent to which the image capture interval could be shortened.

In order to increase the speed of photographing signal processing, image data of one picture obtained by one photographing operation may be divided, and photographing signal processing of one image may be shared (parallel processing) by a plurality of processors. However, since the photographing signal processing includes an interpolating process using a large number of peripheral pixels, the interpolating process cannot be performed to the pixels near a position where the image data is divided by merely dividing the image data. For this reason, when the images processed by the respective processors are joined with each other, image breakage occurs at a joined portion.

SUMMARY OF THE INVENTION

The present invention has been made to solve the above problems, and has an object to provide a digital camera which can shorten an image capture interval.

In order to achieve the above object, a first aspect of the invention provides a digital camera which causes an image pickup element to photograph an object to obtain image data expressing an object image, including a plurality of photographing signal processing units for sharing predetermined photographing signal processing to the image data and performing the predetermined photographing signal processing as parallel processing, wherein the photographing signal processing units, for the photographing signal processing in regions assigned by the photographing signal processing units, capture the image data such that each of the photographing signal processing unit and another photographing signal processing unit which have adjacent assigned regions are at least partially overlapped.

According to the first aspect of the invention, photographing signal processing for image data expressing an object is shared by the plurality of photographing signal processing units and performed as parallel processing. At this time, in each of the photographing signal processing units, for the photographing signal processing of a region assigned by the photographing signal processing unit, image data is captured such that the photographing signal processing unit and another photographing signal processing unit are at least partially overlapped in adjacent assigned regions, i.e., the image data is divided and captured such that an overlapping region is set between the photographing signal processing units having adjacent assigned regions. For this reason, photographing signal processing including an interpolating process can be performed to pixels near a joined portion between the assigned regions. Therefore, since the photographing signal processing for image data expressing an object image can be shared by the plurality of photographing signal processing units and performed as parallel processing without causing image breakage, an image capture interval can be shortened.

When the photographing signal processing is shared by the plurality of photographing signal processing units and performed as parallel processing as described above, an object image is divided into assigned regions of the photographing signal processing regions, resulting in a plurality of image data. With respect to the plurality of image data, the digital camera further includes a recording unit for recording the image data processed by the photographing signal processing units in a predetermined recording media. In a recording operation performed by the recording unit, the plurality of image data obtained by dividing the object image into the assigned regions as a result of parallel processing performed by the plurality of photographing signal processing units is rearranged as one image data expressing the object image (a second aspect of the invention).

The digital camera may further include a recording unit for recording image data processed by the photographing signal processing units in a predetermined recording media, so that the plurality of image data obtained by dividing the object image into the assigned regions as a result of parallel processing performed by the plurality of photographing signal processing units is separately recorded by the recording unit (a third aspect of the invention). The digital camera generally includes a display unit for displaying the object image based on the image data. When the plurality of image data is recorded in the predetermined recording media as different data as described above, in order to display the object image, the display units may rearrange the plurality of image data separately recorded by the recording unit and obtained by dividing the object image into the assigned regions as one image data expressing the object image in a display operation performed by the display unit (a fourth aspect of the invention) For this purpose, the recording unit may record the plurality of image data constituting the same object image in relation to each other (a fifth aspect of the invention).

The recording media may be built in the digital camera, or may be detachably loaded on the digital camera.

DETAILED DESCRIPTION OF THE INVENTION

An example of embodiments according to the present invention will be described below with reference to the accompanying drawings.

Figure 1:
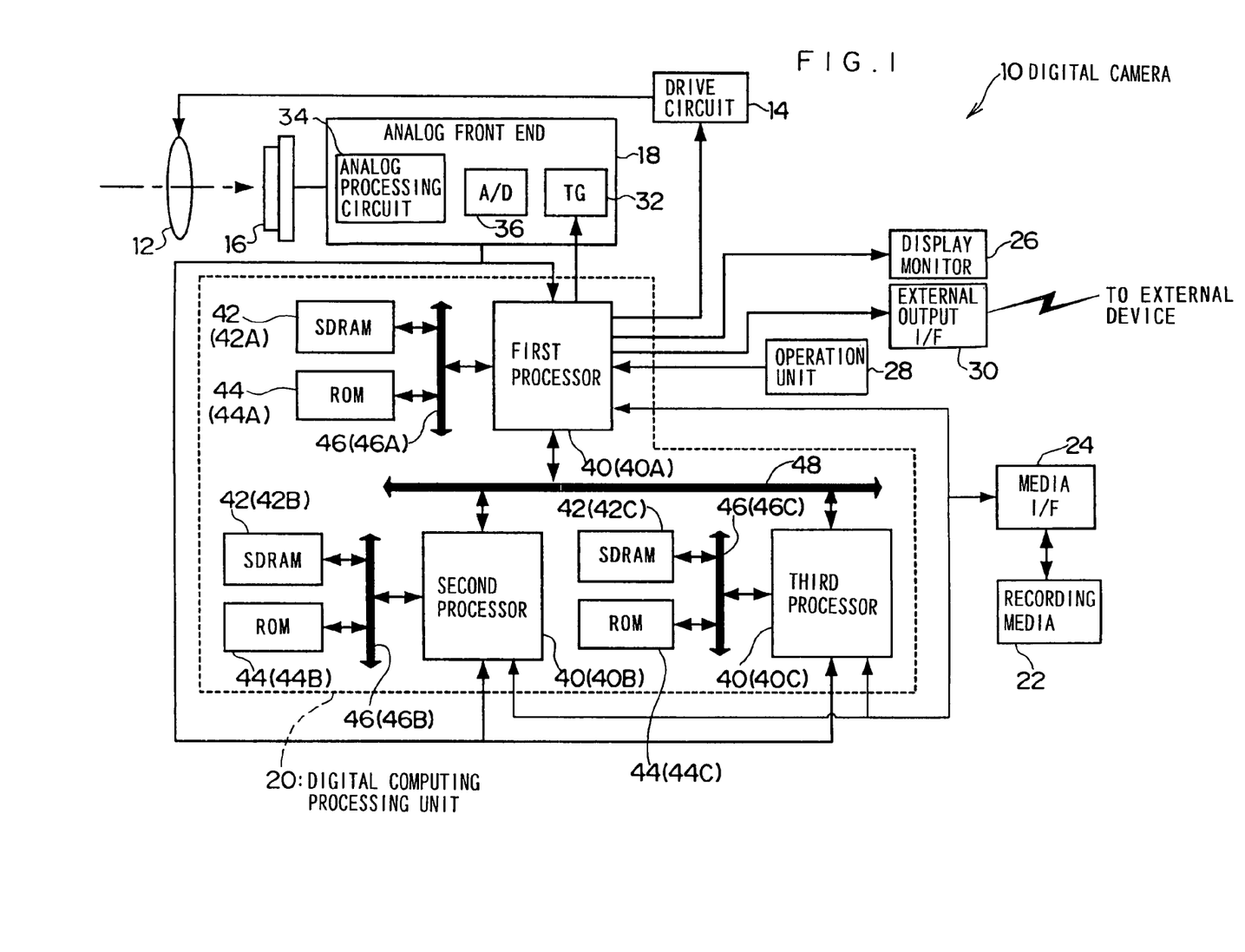
FIG. 1 is a block diagram showing a configuration of an electric system of a digital camera according to an embodiment of the present invention.

As shown in FIG. 1, a digital camera 10 according to this embodiment comprises an optical unit 12 including a lens for forming an object image; a drive circuit 14 for driving the optical unit 12; a CCD image sensor (to be referred to as a "CCD" hereinafter) 16, which is arranged behind the optical unit 12 along the optical axis thereof, for photographing the object image at a level of ten million pixels; an analog front end 18 for controlling the drive of the CCD 16 and performing a predetermined analog signal processing to an output signal read from the CCD 16 and expressing the object image; a digital computing processing unit 20 for mainly performing a predetermined digital signal processing to image data; a media interface (I/F) 24, serving as a recording unit, for controlling a reading/writing operation of various data from/in a recording media 22; a display monitor 26, serving as a display unit, for displaying an image or various pieces of information obtained by photographing; an operation unit 28 operated by a photographer; and an external output I/F 30 for outputting image data to an external device such as a PC connected to the external output I/F 30 through a predetermined cable.

The operation unit 28 includes, although not shown, a release button operated by the photographer to instruct the digital camera photograph and record a still image, a mode change-over switch operated to select any one of a photographing mode and a reproducing mode, a cursor button operated to set various parameters and to designate an image to be reproduced when the reproducing mode is selected, a power supply switch operated to turn on/off the power of the digital camera 10, and the like.

The optical unit 12 is a zoom lens (variable focal-length lens) comprising a mechanism (auto-focus (AF) mechanism) which can change a focal point position by drive force of a drive source such as a stepping motor or the like. This AF mechanism and the zoom mechanism are also driven by the drive circuit 14. A fixed focal-length lens comprising only an AF mechanism may be used.

In this embodiment, a so-called TTL (Through The Lens) scheme which adjusts a lens position such that the contrast of an image obtained by photographing is maximum is employed as a focusing control scheme. The focusing control is automatically performed such that the lens focuses on an object located at a predetermined position (AF frame) in a photographing area. More specifically, when the photographing mode is selected by an operation of a mode change-over switch of the operation unit 28 by a photographer, the release button is halfway depressed to automatically perform focusing control.

The CCD 16 serving as an image pickup element is arranged at a position corresponding to the focal point position of the optical unit 12. Light passing through the optical unit 12 forms an image on the light-receiving surface of the CCD 16.

On the light-receiving surface of the CCD 16, a large number of photoelectric conversion cells are arranged in a matrix, signal charges depending on light intensities of lights received by the respective cells are accumulated, and the accumulated signals are output as analog image signals. More specifically, in this embodiment, as the CCD 16, an interline type CCD sensor having a so-called "electronic shutter function" is used. The invention does not especially limit the type of the CCD 16. In place of the CCD 16, a CMOS image sensor can also be used.

The CCD 16 is connected to the analog front end 18. The analog front end 18 comprises a timing generator (TG) 32, an analog processing circuit 34, and an A/D converter (A/D) 36.

The timing generator (TG) 32 mainly generates timing signals (to be described later) for driving the CCD 16, the analog processing circuit 34, and the A/D converter (A/D) 36 to supply the timing signals to the CCD 16, the analog processing circuit 34, and the A/D converter (A/D) 36. The timing generator (TG) 32 may be arranged independently of the analog front end 18 or may be built in the CCD 16.

The CCD 16 outputs analog image signals (signals representing light intensities of lights received by the large number of photoelectric conversion cells arranged in a matrix on the light-receiving surface) expressing a photographed object image in synchronism with timing signals from the timing generator (TG) 32. The analog image signals output from the CCD 16 are designed to be input to the analog front end 18.

In the analog front end 18, a correlative double sampling process is performed by the input analog image signals in synchronism with the timing signals from the timing generator (TG) 32 to adjust the sensitivities of RGB colors. Thereafter, the analog image signals are converted into digital signals by the A/D converter(A/D)36, and the digital signals are output. The output terminal of the analog front end 18 is connected to the digital computing processing unit 20, and the digital image signals output from the analog front end 18 are transmitted to the digital computing processing unit 20.

The digital computing processing unit 20 comprises a plurality of processors 40. An SDRAM 42 for temporarily storing the image data mainly obtained by photographing performed by the CCD 16 and a ROM 44, in which various programs and parameters are stored in advance, are arranged for each of the processors 40. The processors 40 are connected to each other through the corresponding SDRAMs 42, the corresponding ROMs 44, and the corresponding buses 46, and are designed to be able to arbitrarily access the SDRAMs 42 and the ROMs 44.

As an example of this embodiment, a case in which the first to third processors 40 are arranged will be described below. When the processors are distinguished from each other, the processors are called a first processor 40A, a second processor 40B, and a third processor 40C. In the following description, alphabets (A/B/C) for representing corresponding processors will be added to the end of the reference numerals representing the SDRAMs 42, the ROMs 44, and the buses 46.

The processors 40 are connected to the analog front end 18 and the media I/F 24 to be able to exchange various types of information therewith. The processors 40 can receive digital image signals output from the analog front end 18 to the digital computing processing unit 20. The processors 40 temporarily store the received digital signals in predetermined regions of the corresponding SDRAMs 42 as image data. Thereafter, the image data are read from the SDRAMs 42, subjected to a predetermined digital signal processing, and rewritten in the corresponding SDRAMs 42.

The digital signal processing executed by the processors 40 includes, for example, a defective pixel correction process for correcting image data corresponding to a defective pixel of the CCD 16 by using the image data corresponding to pixels around the defective pixel, a γ-correction process for correcting the brightness of an image, an edge emphasizing process for sharpening an image, a gain correction process for performing balance adjustment for colors (so-called white balance correction process), and a Y-C conversion process for converting image data of three primary colors of R (Red), G (Green), and B (Blue) into Y signals (luminance signals) and C signals (color-difference signals). The data rewritten in the SDRAM 42 are data which have been subjected to the Y-C conversion process (Y-C signals).

The image data rewritten in the SDRAM 42 is read by the corresponding processor 40 when photographic recording is designated by the user, subjected to a compression process for compressing data by a predetermined compression format (e.g., JPEG (Joint Photographic Experts Group) format or the like), and recorded in the same recording media 22 through the media I/F 24. As the recording media 22, various forms such as a Microdrive, a Smartmedia, a PC card, a MultiMedia Card (MMC), a magnetic disk, an optical disk, a magneto optical disk, and a Memory Stick can be used. A signal processing unit and an interface depending on a media to be used are applied.

In the following description, the processes (digital signal processing or compression process) executed to the image data by the processors 40 will generically be referred to as "photographing signal processing".

Figure 2:
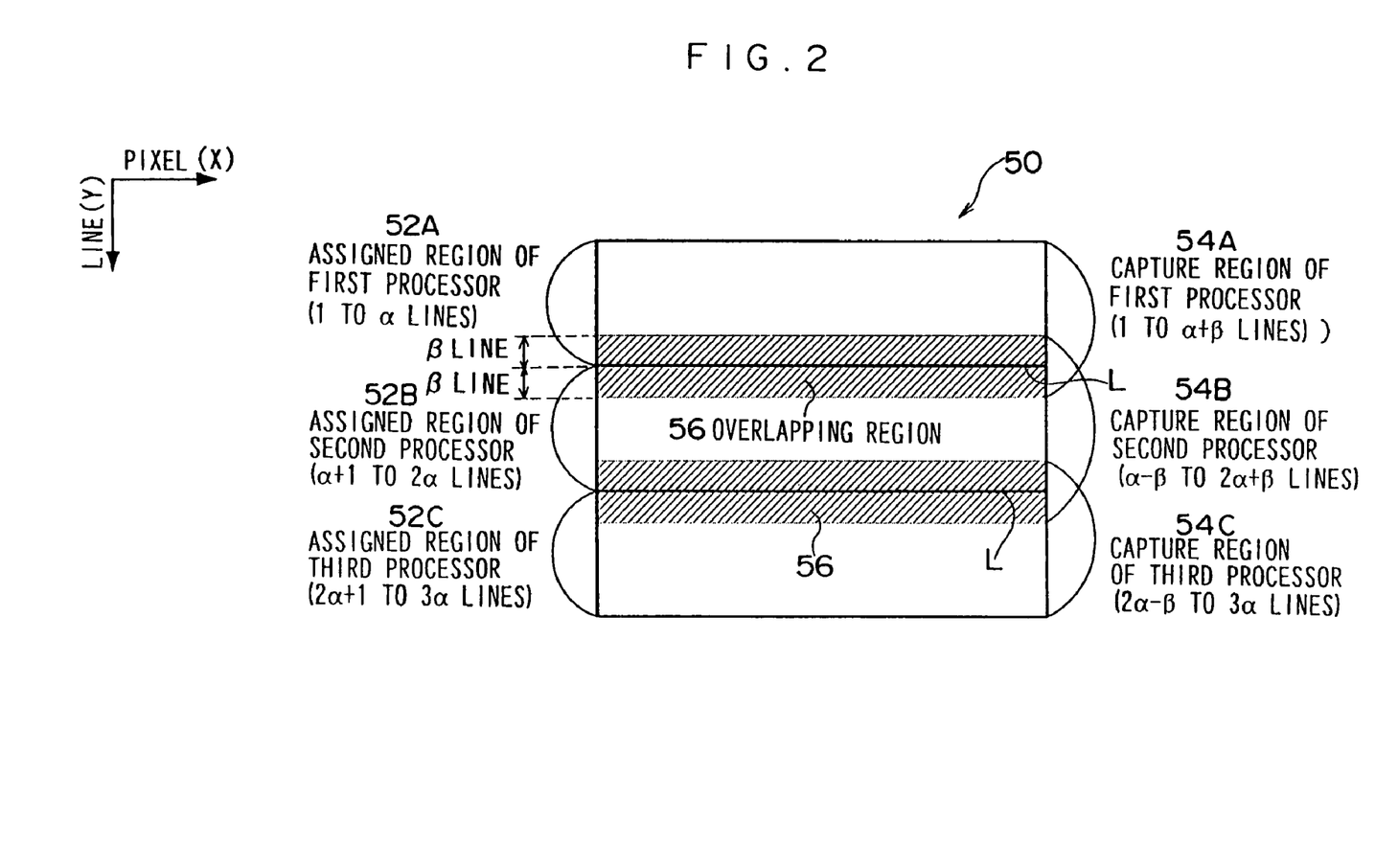
FIG. 2 is a conceptual diagram showing the relationship between assigned regions and capturing regions which are determined for performing a dividing process to one image by first to third processors.

In this case, in the digital camera 10 according to this embodiment, in order to increase a speed of the photographing signal processing, as shown in FIG. 2, one image (one frame) 50 obtained by one photographing operation is divided into three regions (assigned regions) 52, so that the photographing signal processing is shared by the first to third processors 40A to 40C. FIG. 2 shows a case in which the image 50 is constituted by 3α lines (α: positive integer), the image being equally divided into three α lines in a line direction. In FIG. 2, alphabets (A/B/C) representing the assigning processors 40A to 40C are added to the end of the reference numerals of the assigned regions 52.

For this reason, to the processors 40, in addition to the image data, the timing signals generated by the timing generator (TG) 32 are also supplied from the analog front end 18. The timing signals are preferably supplied and delayed until an image signal is read from the CCD 16 through a delay circuit or the like and subjected to an analog signal processing and an A/D conversion process by the analog front end 18 to output a digital image signal.

In each of the processors 40, based on a timing signal output from the timing generator (TG) 32, reception of the digital image signal output from the analog front end 18 is started and ended at a corresponding predetermined timing to capture the image data of regions (hereinafter, "capturing regions") 54 required for photographing signal processing for the assigned regions 52, so that the photographing signal processing is conducted for the assigned regions 52. For this reason, set values (image capture start line A and image capture end line B (to be described later)) for determining capture start and end timings of the digital image signal are designed to be stored in advance in the ROM 44. In FIG. 2, alphabets (A/B/C) representing the first to third assigning processors 40A to 40C are added to the end of the reference numerals of the capturing regions 54.

Figure 3A:
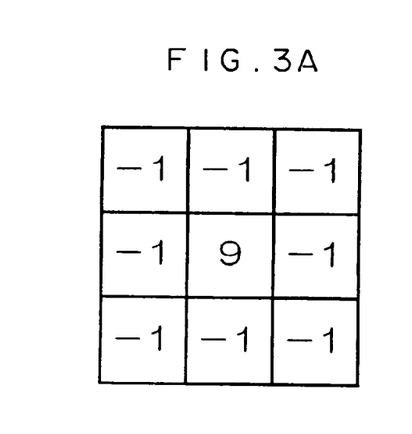
FIG. 3A is a diagram showing an example of a two-dimensional filter.
Figure 3B:
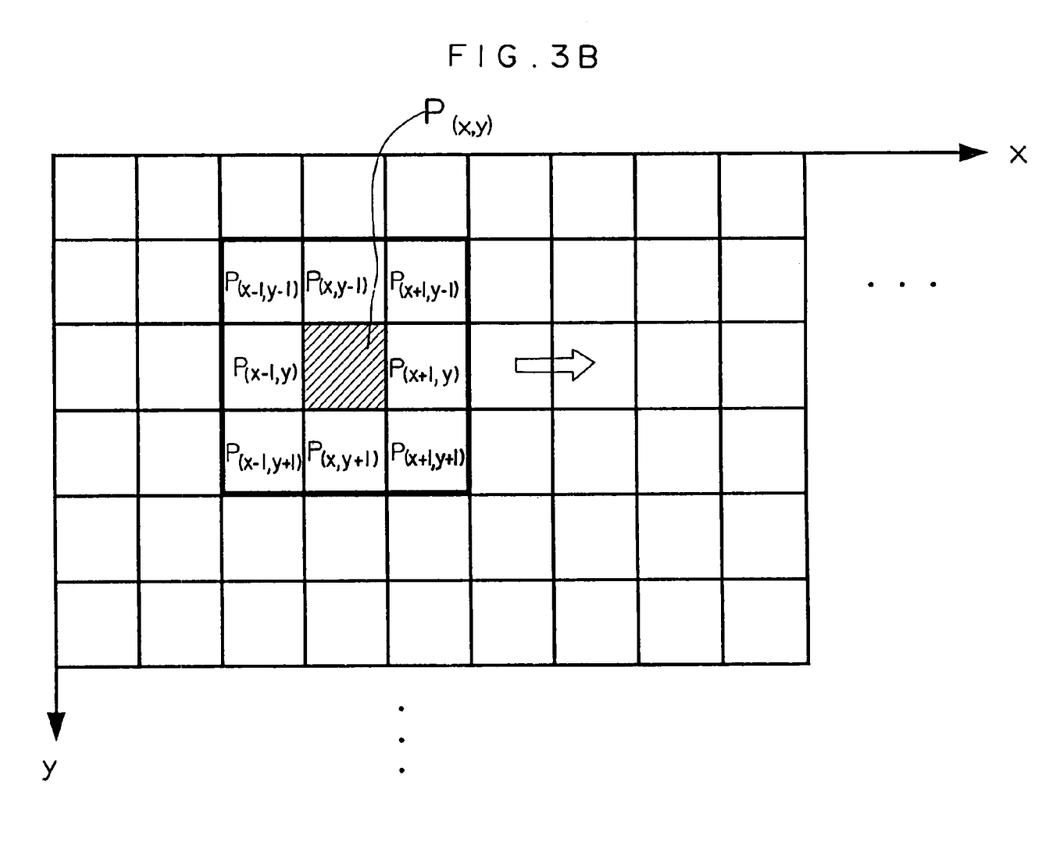
FIG. 3B is a conceptual diagram for explaining an interpolating process using the two-dimensional filter in FIG. 3A.

The photographing signal processing includes an computing operation for performing an interpolating process to the value of a target pixel by using a large number of pixels around the target pixel. For example, in the edge emphasizing process, a two-dimensional filter expressing a coefficient of 3 pixels×3 pixels as shown in FIG. 3A is used to perform an interpolating process (also generally called a "filtering process") by using a total of 9 pixels including the target pixel and the pixels therearound, so that a Laplacian image is subtracted from an original image to sharpen the image. More specifically, as shown in FIG. 3B, a pixel corresponding to the center pixel of the two-dimensional filter is defined as a target pixel P(x, y), and the values of the total of 9 pixels including the target pixel and the pixels therearound are multiplied by corresponding coefficients shown in the two-dimensional filter in FIG. 3A and are summed up. The resultant value is set as the value of the target pixel P(x, y). More specifically, in the example shown in FIGS. 3A and 3B, by the following computing operation:

$$P(x,y)=(-1)\times P(x-1, y-1)+(-1)\times P(x, y-1)+(-1)\times P(x+1, y-1)+(-1)\times P(x-1, y)+(-1)\times P(x, y)+(-1)\times P(x+1, y)+(-1)\times P(x-1, y+1)+(-1)\times P(x, y+1)+(-1)\times P(x+1, y+1),$$

the value of the target pixel P(x, y) is calculated. The computing operation is performed to the pixels while the two-dimensional filters are moved on the image, so that an image data expressing an image obtained by sharpening the original image can be achieved.

In this embodiment, in consideration of the interpolating process using the large number of peripheral pixels, as shown in FIG. 2, in capturing regions 54 of the processors 40, an overlapping region 56 is formed such that the neighborhoods of joined portions L (serving as dividing positions of the image) between the assigned regions of the processors 40 having adjacent assigned regions 52 overlap. In the example in FIG. 2, image data of a total of 2β lines including upper and lower β lines (β: a positive integer smaller than α) of the joined portion L are designed to be captured by the processors 40 having adjacent assigned regions 52. More specifically, in the first to third processors 40, divided image data are captured such that the overlapping regions 56 are arranged between the processors 40.

The size of the overlapping region 56 is determined depending on a positional relationship between target pixels and peripheral pixels used in an interpolating process for the target pixels, in other words, the size of a filter. For example, when the maximum size of filters used in various interpolating processes performed in photographing signal processing is 3 pixels×3 pixels as shown in FIG. 3, the overlapping region 56 may have a size corresponding to at least a total of two lines including one upper line and one lower line of the joined portion L.

The first to third processors 40A to 40C are connected to a bus 48 as shown in FIG. 1, and can communication with each other through the bus 48. Each of the first to third processors 40A to 40C can transmit and receive the image data processed by a communication through the bus 48, and can recognize the statuses of the other processors.

At least one of the first to third processors 40A to 40C, more specifically, the first processor 40A in this embodiment, is connected to the display monitor 26 and the external output I/F 30. Under the control of the first processor 40A, a photographed image is displayed on the display monitor 26, and image data obtained by photographing can be output from the external output I/F 30 to an external device. The image data output to the external device is designated by the external device through the external output I/F 30.

When the photographing mode is selected, the display monitor 26 displays a video (through images) obtained by continuous photographing performed by the CCD 16 and is designed so as to be used as a viewfinder. When the display monitor 26 is used as a viewfinder, the second and third processors 40 transmit image data processed thereby and subjected to the Y-C conversion to the first processor 40A, and the first processor 40A sequentially outputs the image data (Y-C signals), which are processed by the first to third processors 40 and subjected to the Y-C conversion, to the display monitor 26 through a display control circuit (not shown) for converting the image data (Y-C signals) into video signals of a predetermined format (for example, NTSC format). In this manner, the through images are displayed on the display monitor 26.

With respect to the through images, it is unnecessary to use the data of all the pixels of the CCD 16. When the number of pixels is so large that the through images cannot be easily displayed near real-time, the photographed images may be thinned and then used. In this case, the thinning process may be performed such that digital image processing is performed by the processors 40. However, in order to increase the speed of the interpolating process, image signals output from the CCD 16 are read while being thinned, or the image signals are captured by the processors 40 while being thinned.

At least one of the first to third processors 40A to 40C, more specifically, the first processor 40A in this embodiment, is used as a master processor for controlling the entire operation of the digital camera 10 including the processes of the other processors 40.

For this reason, the first processor 40A serving as the master processor is also connected to the drive circuit 14, the timing generator 32, and the operation unit 28. The first processor 40A controls the operations of the drive circuit 14, the timing generator 32, and the processors 40 based on an operation of the operation unit 28, so that the entire operation of the digital camera 10 can be controlled.

The operation of this embodiment will be described below.

The digital camera 10 according to this embodiment is activated when the power supply is turned on by an operation of the power supply switch of the operation unit 28 performed by a photographer. When the photographer performs a photographing operation with the digital camera 10, the mode change-over switch of the operation unit 28 is operated to select a photographing mode. When the photographing mode is selected by the photographer, the digital camera 10 operates as shown in FIG. 4.

Figure 4:
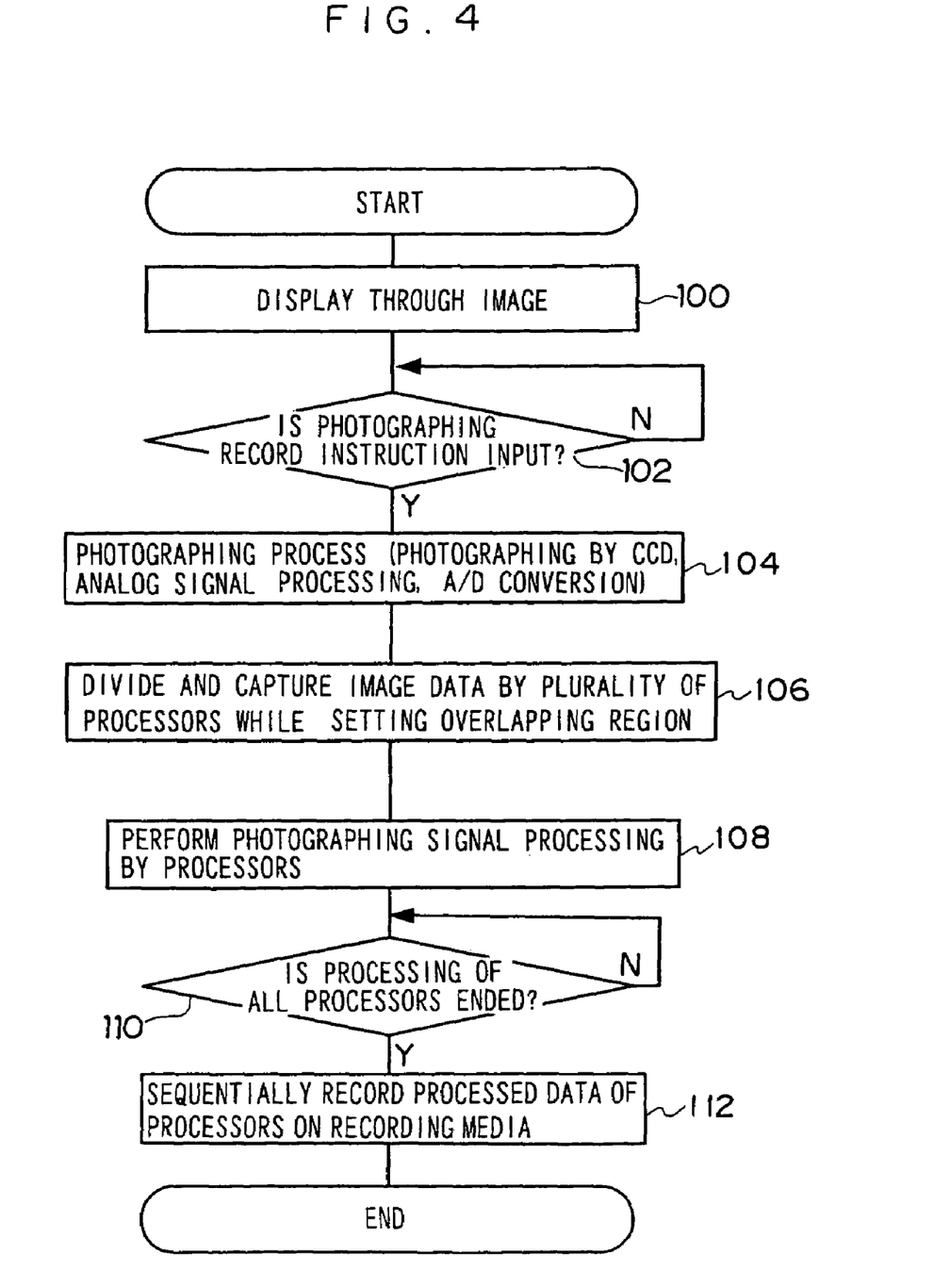
FIG. 4 is a flow chart showing operations when a photographing mode is selected in the digital camera according to the embodiment of the present invention.

More specifically, in the digital camera 10, when the photographing mode is selected, continuous photographing operations of the CCD 16 are started through the optical unit 12 under the control of the first processor 40A serving as the master processor in step 100, and through images are displayed on the display monitor 26 in step 100 of FIG. 4. A photographer adjusts an angle of view (view angle) for photographing while checking an object image by the through images and then operates the release switch of the operation unit 28. More specifically, the photographer depresses the release switch halfway to drive the drive circuit under the control of the first processor 40A, thereby causing the digital camera 10 to execute focusing control. Thereafter, the photographer fully depresses the release button to input a photographing record instruction.

In the digital camera 10, when the photographing record instruction is input such that the release switch of the operation unit 28 is operated, the first processor 40 shifts from the next step 102 to step 104 to perform a photographing process. More specifically, the timing generator 32 is driven under the control of the first processor 40 to cause the CCD 16 to photograph the object image set in an in-focus state by the focusing control.

In this manner, in synchronism with the timing signals output from the timing generator 32, analog image signals expressing the photographed object image are sequentially output from the CCD 16 and input to the analog front end 18. In the analog front end 18, the analog image signals input from the CCD 16 are subjected to predetermined analog signal processing such as a correlative double sampling process and sensitivity adjustment in units of RGB colors and are then A/D converted, and digital image signals are output.

In the next step 106, when the first processor 40A instructs itself and the other processors 40B and 40C to capture digital image signals, the first to third processors 40A to 40C capture the digital image signals of one image output from the analog front end 18 separately while setting the overlapping regions 56 between the first to third processors 40A to 40C as shown in FIG. 2.

More specifically, in the analog front end 18, since a signal output in synchronism with a timing signal from the timing generator 32 is subjected to the analog signal processing and the A/D conversion and is then output, a digital image signal is also output from the analog front end 18 in synchronism with the timing signal output from the timing generator 32. Since the timing signals from the timing generator 32 are also output to the processors 40, the positions of the digital image signals output from the analog front end 18 on the image are recognized based on the timing signals, and digital image signals corresponding to the capturing regions 54 determined by setting the overlapping regions 56 between the processors 40 can be selected and captured by the processors 40.

Figure 5:
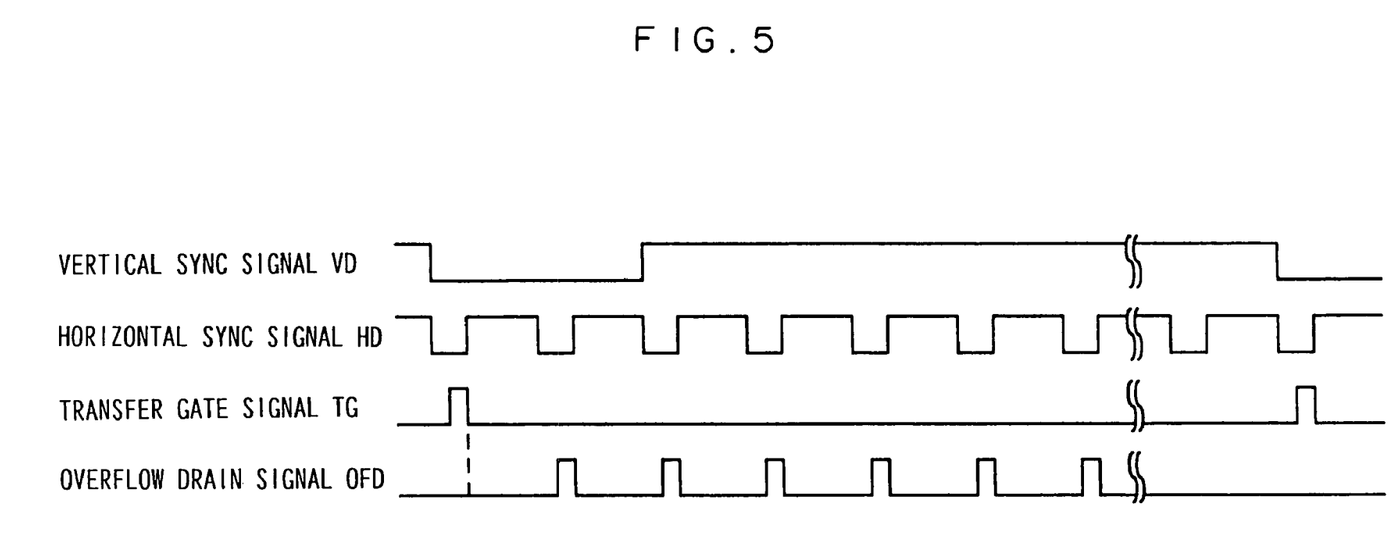
FIG. 5 is a flow chart showing an example of various timing signals generated by a timing generator to drive an interline type CCD sensor.

More specifically, signals to be generated by the timing generator 32 to drive the CCD 16 in a photographing operation in a case in which an interline type CCD sensor is used as the CCD 16 will be described below. FIG. 5 shows an example of various timing signals generated by the timing generator 32.

As shown in FIG. 5, the timing generator 32 generates a vertical synchronous signal VD and a horizontal synchronous signal HD of an image-pickup system whose cycles are predetermined in a photographing operation, and outputs the vertical synchronous signal VD and the horizontal synchronous signal HD to the CCD 16. The timing generator 32 generates, in synchronism with the vertical synchronous signal VD, a transfer gate signal TG serving as a signal which transfers signal charges from a light-receiving element held by the CCD 16 to a vertical transfer path and an overflow drain signal OFD which represents a timing at which excessive charges are swept by an over drain held by the CCD 16 and supplies the transfer gate signal TG and the overflow drain signal OFD to the CCD 16.

In one cycle of the vertical synchronous signal VD, the time from when the transfer gate signal TG is at an active level (high level in the example in FIG. 5) ends to the time in which the overflow drain signal OFD is at an active level (high level in the example in FIG. 5) ends is almost equal to a period of operation of the electronic shutter of the CCD 16. In the CCD 16, excessive charges are periodically swept by the overflow drain signal OFD, so that signal charges are accumulated while preventing blooming from occurring when the transfer gate signal TG is at a low level. When the transfer gate signal TG rises and reaches an active level, the signal charges accumulated in all of the light-receiving elements are transferred to the vertical transfer path. The signal charges transferred to the vertical transfer path are sequentially transferred in a vertical direction and output from a horizontal transfer path in synchronism with the horizontal synchronous signal HD one line at a time as an image signal.

The timing generator 32 drives the CCD 16 based on the various timing signals, so that analog image signals of one image (one frame) can be output in one cycle of the vertical synchronous signal VD one line at a time each time the horizontal synchronous signal HD is input from the CCD 16.

Figure 6:
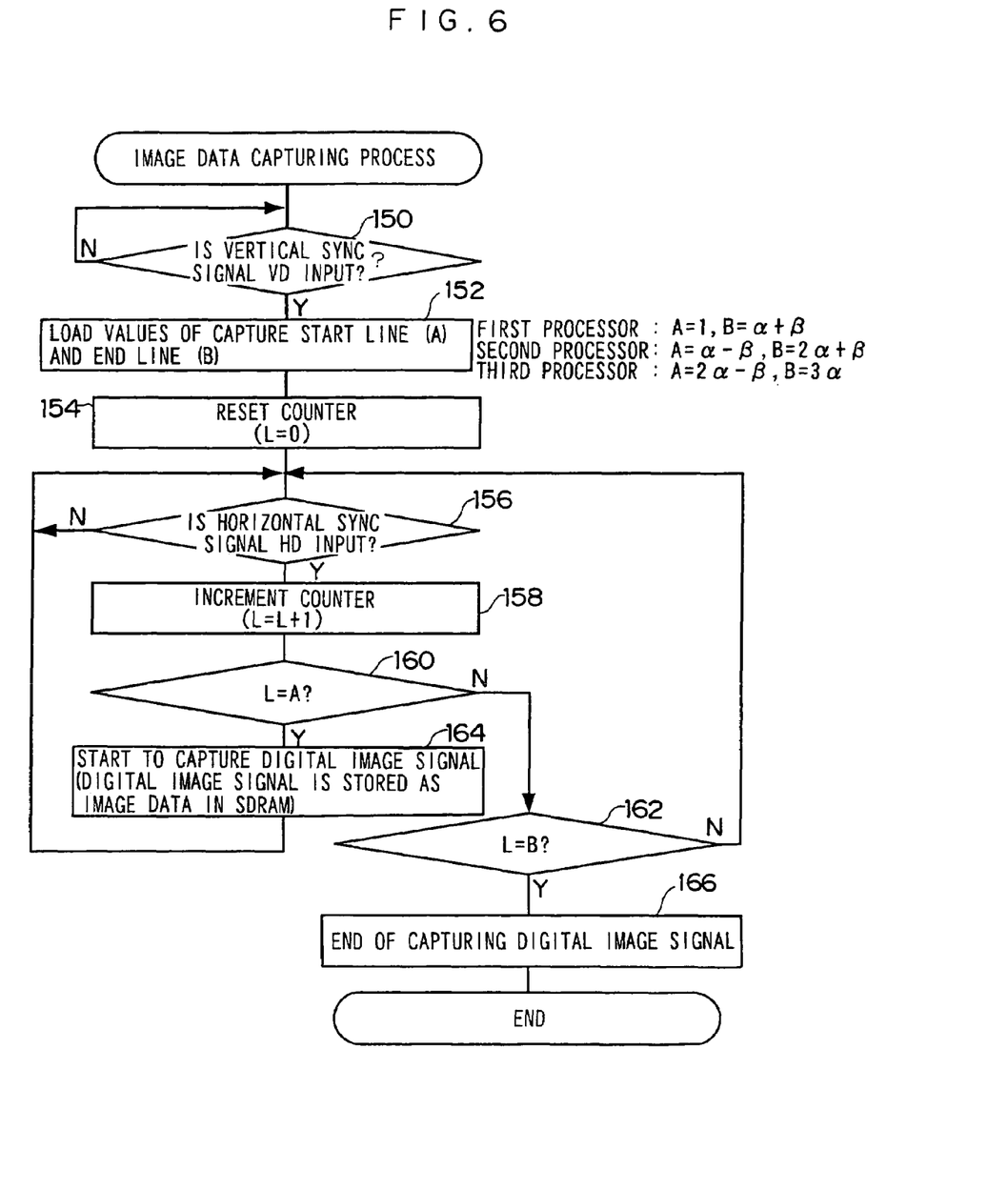
FIG. 6 is a flow chart showing an example of processes executed by the first to third processors to capture a digital image signal corresponding to a capturing region.

In the processors 40, when the CCD 16 is driven by the timing signals from the timing generator 32, for example, the processes shown in FIG. 6 are executed to enable capture of digital image signals corresponding to each of the capturing regions 54. FIG. 6 shows only an example, and in the invention, the processes for capturing digital image signals are not limited to the processes shown in FIG. 6.

It is assumed that the values of an image capture start line A and an image capture end line B (A<B) are stored in advance as set values in the ROMs 44A to 44C to determine the capture start/end timings of the digital image signals of the corresponding processors 40A to 40C. More specifically, in the ROM 44A, a capture start line A=1 and a capture end line B=α+β of the first processor are stored. In the ROM 44B, a capture start line A=α−β and a capture end line B=2α+β of the second processor are stored. In the ROM 44C, a capture start line A=2α−β and a capture end line B=3α of the first processor are stored.

As shown in FIG. 6, when the vertical synchronous signal VD is input from the timing generator 32, the processors 40 shift from step 150 to step 152 to load the set values of the capture start line A and the capture end line B stored in the corresponding ROMs 44. In the next step 154, each of the processors 40 resets a value L (L=0) of a counter representing a specific line of digital image signals output from the analog front end 18.

Thereafter, the processor 40 waits until the horizontal synchronous signal HD is input from the timing generator 32. When the horizontal synchronous signal HD is input, the processor 40 shifts from the next step 156 to step 158 and increments the value L of the counter (L=L+1). Until the incremented value L of the counter becomes equal to the value of the capture start line A loaded in step 152, the processor 40 returns from the next step 160 to step 156 through step 162 to repeat the same processes as described above. When the value L of the counter becomes equal to the value of the capture start line A (L=A), the processor 40 shifts from step 160 to step 164 to start capture of the digital image signals.

More specifically, after the vertical synchronous signal VD is input, the digital image signals are output from the analog front end 18 in units of lines in synchronism with the horizontal synchronous signal HD. However, in each of the processors 40, until the value L of the counter becomes equal to the value of the capture start line A, the counter value is incremented each time the horizontal synchronous signal HD is input and only the number of lines representing a specific line of output digital image signals are counted. When the value L of the counter becomes equal to the value of the capture start line A, the processor 40 starts to capture the digital image signals, sequentially receives digital image signals subsequent to the digital image signals of the capture start line A, and stores the digital image signals in the corresponding SDRAM 42 as image data.

After the capture of the digital image signals in step 164 is started, the processor 40 returns to step 156, and, similarly, the processor 40 waits for an input of the horizontal synchronous signal HD. When the horizontal synchronous signal HD is input, the processor 40 increments the value of the counter in step 158. Until the value L of the counter becomes equal to the value of the capture end line B loaded in step 152, the processor 40 returns from the next step 160 to step 156 through step 162. That is, the counting operation of the number of lines is continued while the digital image signals are captured.

Thereafter, when the value L of the counter becomes equal to the value of the end line B (L=B), the processor 40 shifts from step 162 to step 166 to end the capture of the digital image signals, and the processes in FIG. 6 are ended.

These processes enable the processors 40A to 40C to capture only digital image signals corresponding to the respective capturing regions from the digital image signals of one image output from the analog front end 18. More specifically, the processors 40A to 40C separately capture the digital image signals of one image while setting the overlapping regions 56 between the processors 40A to 40C.

Thereafter, in the digital camera 10, the processors 40 shift to step 108 in FIG. 4 to perform photographing signal processing to image data captured by the processors 40 and stored in the SDRAMs 42. More specifically, in each of the processors 40, image data is read from the SDRAM 42 and subjected to a defective pixel correction process, a γ-correction process, an edge emphasizing process, and a gain correction process. The resultant image data is converted into a Y-C signal by a Y-C conversion process, and the Y-C signal is rewritten in the SDRAMs 42. Subsequently, the processors 40 read the image data from the SDRAMs 42 (data converted into a Y-C signal) and compress the image data into JPEG format to record the image data on recording media 22.

In the next step 110, the processors 40 wait until the photographing signal processing in all the processors 40 are ended. With regard to determining the completions of the photographing signal processing, in this embodiment, the processors 40 notify each other the sequential completions of compressing processes. With these notifications, the first processor 40A which serves as the master processor determines whether photographing signal processing by all the processors 40 has ended or not.

Upon completion of photographing signal processing by all the processors 40, the processors 40 shift from the next step 110 to step 112, and the image data subjected to the photographing signal processing in the assigned regions 52 are sequentially recorded on the recording media 22 through the media I/F 24. More specifically, the image data of one image subjected to the dividing process by the first to third processors 40A to 40C are recorded on the same recording media 22.

In this manner, the image data of one image recorded on the recording media 22 and subjected to the dividing process by the first to third processors 40A to 40C are read from the recording media 22 by the first processor 40A serving as, e.g., the master processor, when a reproducing mode for reproducing and displaying a photographed image is selected by an operation of the mode change-over switch of the operation unit 28 by a photographer to designate a reproducing operation. The image data read by the first processor 40A is subjected to a predetermined image expanding process and then transferred to the display monitor 26 through a display control circuit (not shown), thereby displaying (reproducing and displaying) the resultant image on the display monitor 26.

In the step 112, the image data in the assigned regions 52 subjected to the dividing process by the first to third processors 40A to 40C may be recorded on the recording media 22 as one file or recorded on the recording media 22 as different files.

When the image data subjected to the dividing process are recorded as one file, it is necessary to take into account the file system employed by the recording media 22. For example, in the FAT (File Allocation Table) system generally employed as a file system of the recording media 22 by the digital camera 10, the files are accessed in units of sectors which are predetermined amounts of information (for example 512 bytes) However, allocation of physical sectors to the files is performed in units of clusters. Each cluster has an amount of information which can be expressed as 2^[number of physical sectors]. More specifically, the data processing and recording on the recording media 22 are performed in units of clusters.

Figure 7A:
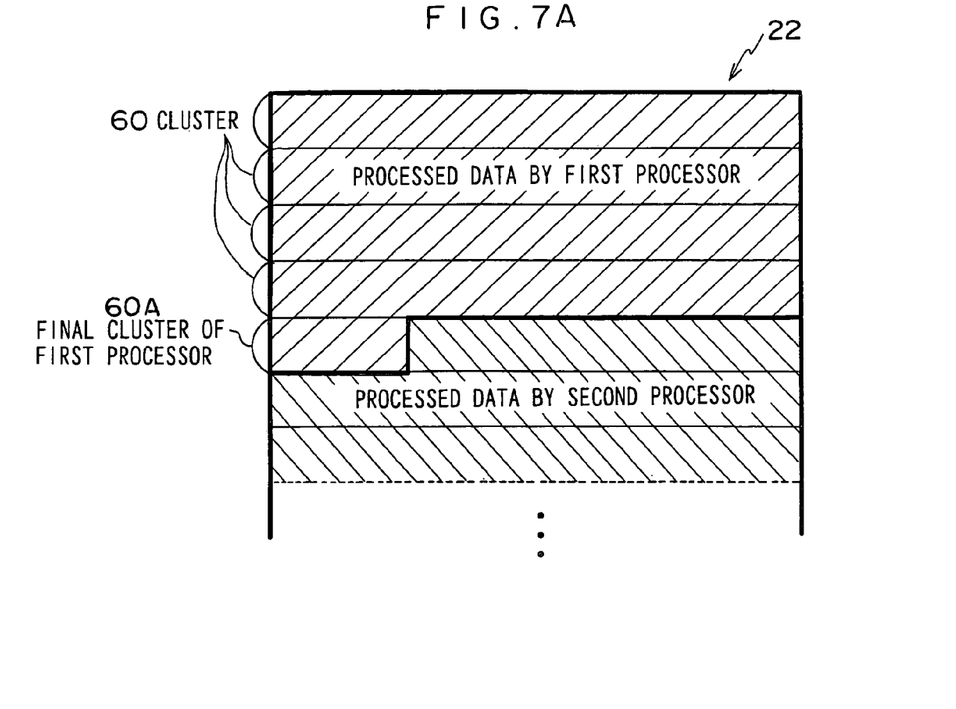
FIG. 7A is a diagram for explaining a recording method used when data processed by the first to third processors are recorded on a recording media as one file.

In this case, the data may be written as shown in FIG. 7A. More specifically, the data processed by the first processor 40A are written by the first processor 40A in clusters 60 of the recording media 22 allocated by the file system. At this time, the size of the data processed by the first processor 40A is not necessarily several times the size of the cluster 60 of the recording media 22. In the middle of the final cluster (hereinafter referred to as a "final cluster of the first processor") 60A in which the data is written by the first processor 40A, writing of the data by the first processor 40A may be ended.

For this reason, in the second processor 40B in which the data is written in the recording media 22 after the data is written in the recording media 22 by the first processor 40A, the data is temporarily read from the final cluster 60A of the first processor 40A, the end of the data written by the first processor 40A is connected to the head of the data processed by the second processor 40B (to be referred to as "rearrangement"), and the resultant data is rewritten in the final cluster 60A of the first processor 40A as continuous addresses. After the data is rewritten in the final cluster 60A of the first processor 40A, the second processor 40B sequentially writes the data processed by the second processor 40B in the next cluster 60 of the recording media 22 allocated by the file system such that the data is subsequent to the data processed by the first processor 40A.

After the data is written in the recording media 22 by the second processor 40B, writing of data is started by the third processor 40C. At this time, similarly, the data of the final cluster of the second processor 40B is temporarily read, and the data and the data processed by the third processor 40C are rearranged. The rearranged data are rewritten in the final cluster of the second processor 40B in relation to continuous addresses, so that the data processed by the third processor 40C may be written. In this manner, data subjected to the dividing process by the first to third processors 40A to 40C can be recorded on the recording media 22 as one file in relation to continuous addresses.

Figure 7B:
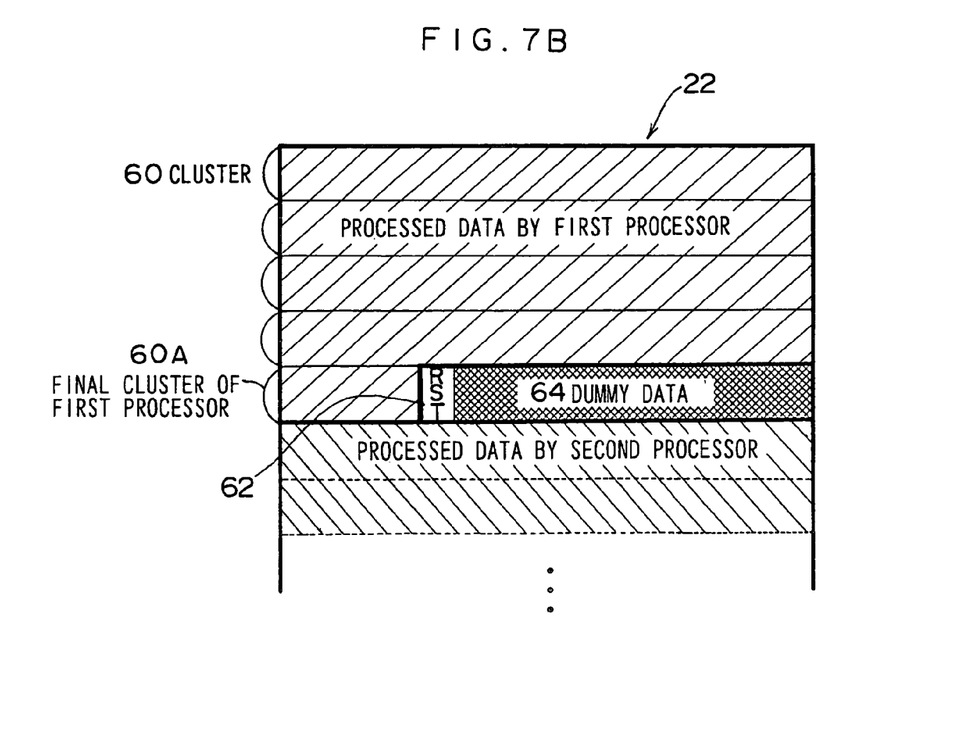
FIG. 7B is a diagram for explaining a recording method used when data processed by the first to third processors are recorded on a recording media as one file.

Depending on compression formats, for example, a code such as a restart code in JPEG format which designates skipping can also be used. In such a case, data is preferably written as shown in FIG. 7B. More specifically, the data processed by the first processor 40A are written by the first processor 40A in the clusters 60 of the recording media 22 allocated by the file system. When all the data are written, a restart code 62 is written last. Since addresses subsequent to the restart code 62 in the final cluster 60A are skipped during reproduction, the data can be handled as if dummy data 64 were inserted.

The data processed by the second processor 40B are written by the second processor 40B in the next cluster allocated by the file system from the start of the cluster. When all of the data are written, similarly, the restart code 62 is written last. Finally, the data processed by the third processor 40C may be written by the third processor 40C in the next cluster allocated by the file system from the start of the cluster. When the restart code 62 is used as described above, the data subjected to the dividing process by the first to third processors 40A to 40C can also be recorded on the recording media 22 as one file. In this case, in comparison with the case shown in FIG. 7A, complex processes such as reading and rearranging the data in the final cluster and then rewriting the rearranged data are unnecessary. For this reason, the data can be recorded at a speed higher than that of the case in FIG. 7A.

On the other hand, when the image data subjected to the dividing process by the first to third processors 40 are recorded on the recording media 22 as different files, the files of the image data processed by the respective processors need to correlate with each other in order to distinguish the files as files constituting the same image. This correlation may be performed such that the names of files of image data (image files) constituting the same image and addresses representing the storage positions of the data are held as table data. However, an easy way is to add the file names to the image files to determine the files constituting the same image.

Figure 8A:
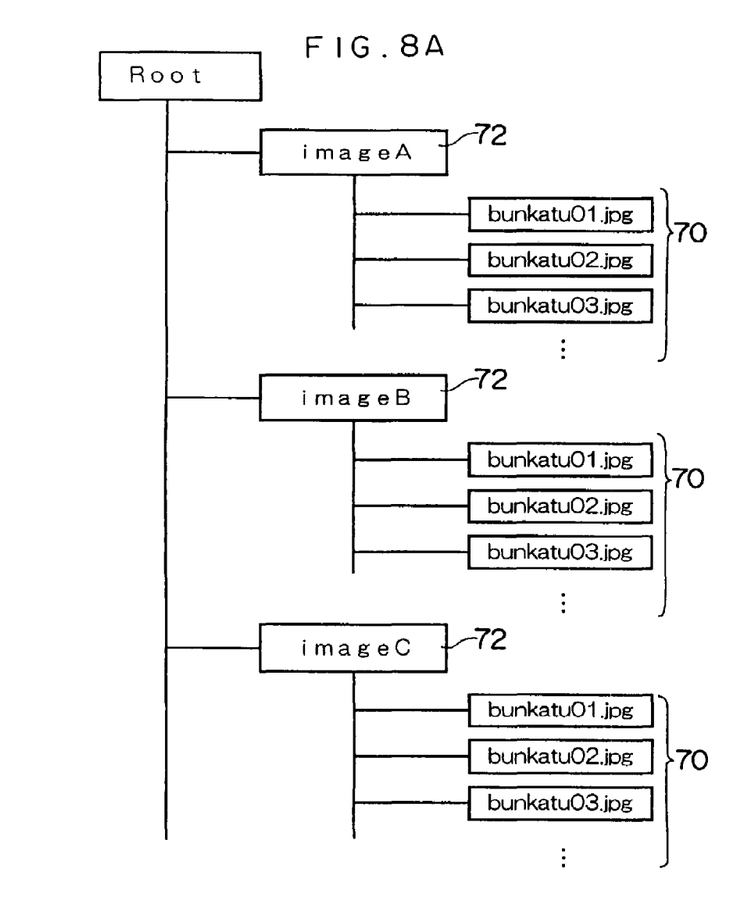
FIG. 8A is a diagram for explaining a recording method used when data processed by the first to third processors are recorded on a recording media as different files.

For example, as shown in FIG. 8A, with respect to the first to third processors 40A to 40C, folders 72 (in FIG. 8A, alphabets representing the corresponding processors 40 are added to the end of folder names, i.e., "imageA", "imageB", and "imageC") for storing files 70 of the image data subjected to the dividing process are set in the recording media 22. The same file names are added to the files each time photographing is performed, and the files 70 of the image data processed by the processors 40 may be stored by the first to third processors 40A to 40C in the folders 72, respectively.

In this manner, the files 70 constituting the same image can be recognized from the file names, a specific processor 40 by which data is processed can be determined based on the folder 72 in which the files 70 are stored, i.e., image data representing a specific part of one image can be determined. When reproducing an image, for example, the files 70 each having the same file name, e.g., a file name: "bunkatu01" are read from the folders 72, respectively, and are subjected to a predetermined image expanding process by the first processor 40A. At the same time, based on the folders 72 in which the files 70 are stored, determination is made on which part of one image the image data of the file 70 represents. The image data of one image are rearranged, so that the image may be reproduced and displayed on the display monitor 26.

Figure 8B:
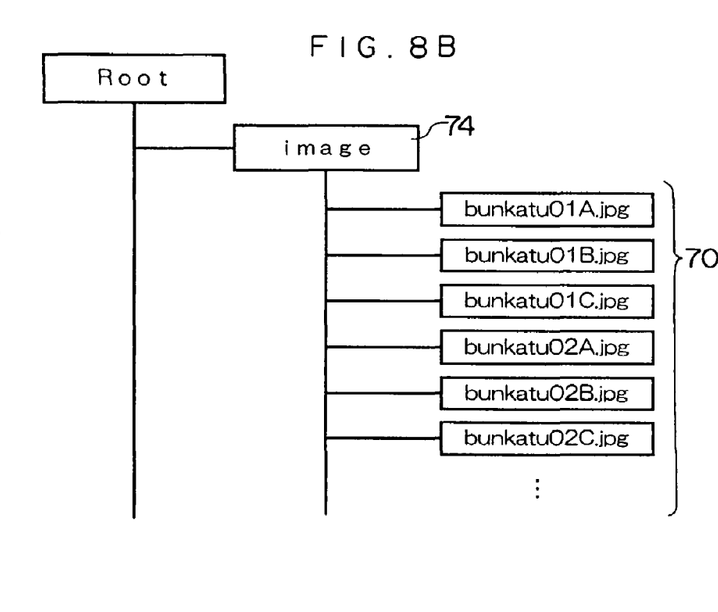
FIG. 8B is a diagram for explaining a recording method used when data processed by the first to third processors are recorded on a recording media as different files.

For example, as shown in FIG. 8B, the same file name (in FIG. 8B, "bunkatuXX" (XX: numbers representing photographing orders or the like which change for each photographing)) is added by the first to third processors 40A to 40C to the files 70 of the image data processed by the first to third processors 40A to 40C, and codes for identifying the first to third processors 40A to 40C are added to the file names (in FIG. 8B, alphabets (A/B/C) representing the corresponding processors are added to the ends of the file names), so that the image data may be stored in the same folder 74 of the recording media 22.

In this manner, even though the image data subjected to the dividing process are stored as different files 70 in the same folder 74 by the first to third processors 40A to 40C, the files constituting the same image and a specific processor 40 by which data is processed can be determined based on the file names, i.e., it can be determined which part of one image the data represents. When reproducing an image, for example, files constituting the same image are determined by the first processor 40 depending on the file names, and the three files 70 having file names: "bunkatu01A", "bunkatu01B", and "bunkatu01C" are read and subjected to a predetermined image expanding process. At the same time, depending on the alphabets added to the ends of the file names of the files 70, it can be determined which part of one image the data represents. The image data of one image are rearranged, and the image can be reproduced and displayed on the display monitor 26.

In this manner, in this embodiment, the plurality of processors, i.e., the first to third processors 40A to 40C are arranged in the digital camera 10, one image (one frame) 50 obtained by one photographing operation is divided into three regions (assigned regions) 52A to 52C, and photographing signal processing for the assigned regions 52A to 52C is shared by the first to third processors 40A to 40C. At the same time, the digital image signals of one image are separately captured by the first to third processors 40A to 40C while setting the overlapping regions 56 as regions required for photographing signal processing for the assigned regions 52 between the first to third processors 40A to 40C. Thus, the processors 40 can also perform photographing signal processing including an interpolating process to pixels near joined portions L between the assigned regions 52. More specifically, photographing signal processing for image data of one image can be shared by the plurality of processors 40 and performed as parallel processing without causing image breakage. For this reason, an image capture interval can be shortened. Even if the number of pixels of the digital camera 10 increases, the number of processors 40 and the number of rewritable recording media 22 are simply increased to prevent an image capture interval from being extended.

In the above, description was mainly given on a case in which digital image signals of one image expressing an object image photographed by a CCD in response to an input of a photographing record instruction by a photographer are divided and captured by the plurality of processors 40, and the photographing signal processing is shared by the plurality of processors. Similarly, digital image signals of images continuously photographed to display through images may be divided and captured by the plurality of processors 40, and photographing signal processing may be shared by the processors 40. In the above description, a digital camera for photographing still images is used, but a digital camera for photographing moving images may also be used.

For explanatory convenience, the above description has been made on the assumption that a CCD sensor of a type (to be referred to as a "horizontal read type") in which image signals are read in the same direction as that of a compressing process of an image is used as the CCD 16. However, the present invention is not limited to the CCD sensor, and may employ a CCD sensor of a type (to be referred to as a "vertical read type") which is attracting attention for its faster speed in reading image signals and in which a compressing direction and a reading direction are at right angles to each other. When the CCD sensor of the vertical read type is used, a process of rearranging pixels of image data such that the vertical side is replaced with the horizontal side and rotating the image by 90° is required. However, by subjecting the image data to a dividing process by the plurality of processors 40, this rotating process can be performed at a high speed. Even though the rotating process is added to the photographing signal processing, there are advantages in using the CCD of the vertical read type. In other words, by subjecting the image data to the dividing process by the plurality of processors 40, a process of the photographing signal processing which had to be abandoned due to a processing speed in a conventional technique can be executed.

What is claimed is:

1. A digital camera which causes an image pickup element to photograph an object to obtain image data expressing an object image comprising:

a plurality of photographing signal processing units for sharing predetermined photographing signal processing to the image data and performing the predetermined photographing signal processing as parallel processing, wherein the photographing signal processing units, for the predetermined photographing signal processing in regions assigned by the photographing signal processing units, capture the image data such that each of the photographing signal processing units and another photographing signal processing unit which have adjacent assigned regions are at least partially overlapped.

2. A digital camera according to claim 1, further comprising a recording unit for recording image data processed by the photographing signal processing units in a predetermined recording media, wherein in a recording operation performed by the recording unit, the plurality of image data obtained by dividing the object image into the assigned regions as a result of parallel processing performed by the plurality of photographing signal processing units are rearranged as one image data expressing the object image.

3. A digital camera according to claim 1, further comprising a recording unit for recording image data processed by the photographing signal processing units in a predetermined recording media, wherein the plurality of image data obtained by dividing the object image into the assigned regions as a result of parallel processing performed by the plurality of photographing signal processing units are separately recorded by the recording unit.

4. A digital camera according to claim 3, further comprising a display unit for displaying the object image based on the image data, wherein in a display operation performed by the display unit, the plurality of image data separately recorded by the recording unit and obtained by dividing the object image into the assigned regions are rearranged as one image data expressing the object image.

5. A digital camera according to claim 3, wherein the recording unit records the plurality of image data constituting the same object image such that the image data are correlated with each other.

6. A digital camera according to claim 4, wherein the recording unit records the plurality of image data constituting the same object image such that the image data are correlated with each other.

7. A digital camera according to claim 2, wherein the recording media is built in the digital camera.

8. A digital camera according to claim 2, wherein the recording media is detachably loaded on the digital camera.

9. A digital camera comprising:

an optical unit including a lens for forming an object image;

a drive circuit for driving the optical unit;

a CCD image sensor, arranged behind the optical unit along an optical axis thereof, for photographing the object image at a level of at least ten million pixels;

an analog front end, connected to the CCD image sensor, for controlling the CCD image sensor and performing predetermined analog signal processing to an output signal expressing the object image and read from the CCD image sensor, to generate digital image signals; and a digital computing processing unit, connected to an output end of the analog front end, constituted by a plurality of processors, for performing predetermined digital signal processing to the digital image signals, wherein each of the plurality of processors recognizes the positions of the digital image signals by timing signals, selects and captures the digital image signals corresponding to capturing regions determined to have overlapping regions therebetween.

10. A digital camera according to claim 9, further comprising:

a media interface for controlling reading/writing of various data from/in a recording media;

a display monitor for displaying an image obtained by photographing or for displaying various types of information;

an operation unit operated by a photographer; and an external output interface for outputting image data to an external device connected through a predetermined cable.

11. A digital camera according to claim 9, wherein the analog front end performs the predetermined analog signal processing including at least one of a correlative double sampling process and sensitivity adjustment in units of RGB colors to an analog image signal input from the CCD image sensor; thereafter the analog image signal is A/D converted to be output as a digital image signal.

12. A digital camera according to claim 11, wherein one of the plurality of processors instructs another processor of the plurality of processors to capture a digital image signal.

13. A digital camera according to claim 9, further comprising a timing generator, connected to the plurality of processors, for supplying the timing signals to the plurality of processors.

* * * * *